US010066346B2

(12) United States Patent
Mennink et al.

(10) Patent No.: US 10,066,346 B2
(45) Date of Patent: Sep. 4, 2018

(54) POINT CLOUD BASED SURFACE CONSTRUCTION

(71) Applicant: Topcon Positioning Systems, Inc., Livermore, CA (US)

(72) Inventors: Jan Mennink, Livermore, CA (US); Vernon Joseph Brabec, Livermore, CA (US)

(73) Assignee: Topcon Positioning Systems, Inc., Livermore, CA (US)

(*) Notice: Subject to any disclaimer, the term of this patent is extended or adjusted under 35 U.S.C. 154(b) by 0 days.

(21) Appl. No.: 14/825,125

(22) Filed: Aug. 12, 2015

(65) Prior Publication Data

US 2017/0044728 A1    Feb. 16, 2017

(51) Int. Cl.
*E01C 23/01* (2006.01)
*G01B 17/08* (2006.01)
*G01C 7/04* (2006.01)
*G01C 15/00* (2006.01)
*E02F 9/26* (2006.01)
(Continued)

(52) U.S. Cl.
CPC ............ *E01C 23/01* (2013.01); *E01C 11/005* (2013.01); *E01C 19/00* (2013.01); *E01C 19/002* (2013.01); *E01C 23/07* (2013.01); *E02F 9/262* (2013.01); *G01B 11/303* (2013.01); *G01B 17/08* (2013.01); *G01B 21/00* (2013.01); *G01C 7/04* (2013.01); *G01C 15/002* (2013.01)

(58) Field of Classification Search
CPC ........ E01C 19/002; E01C 23/01; E01C 23/07; E01C 19/006; G01B 11/303; G01B 17/08; G01C 15/002; G01C 7/04; G05D 1/0274; G01S 15/89; G01S 17/023; G01S 17/87; G01S 17/89; E02F 9/261; E02F 9/262
See application file for complete search history.

(56) References Cited

U.S. PATENT DOCUMENTS 4,733,355 A * 3/1988 Davidson ................ G01S 15/18
172/4
4,914,593 A * 4/1990 Middleton .............. E02F 3/847
172/4
(Continued)

FOREIGN PATENT DOCUMENTS

EP    547378 A1 *  6/1993
EP    1840506       3/2007
KR    100733873     2/2007

OTHER PUBLICATIONS

Lux, P.W. et al., "Range imaging for autonomous navigation of robotic land vehicles", Signal Processing, vol. 22, 1991, pp. 299-311.*

(Continued)

*Primary Examiner* — Behrang Badii
*Assistant Examiner* — David A Testardi
(74) *Attorney, Agent, or Firm* — Chiesa, Shahinian & Giantomasi PC

(57) ABSTRACT

A method and apparatus for filtering point cloud data obtained using a plurality of sensors generates data representative of a surface and for use with a specific type of sensor. The filtering allows certain machines and sensor types to be used to acquire point cloud data and different sensor types to be used during surface construction and modification. The method can be utilized with various types of machine controls and surface construction methods.

22 Claims, 5 Drawing Sheets

(51) Int. Cl.
  *E01C 19/00* (2006.01)
  *G01B 21/00* (2006.01)
  *E01C 11/00* (2006.01)
  *E01C 23/07* (2006.01)
  *G01B 11/30* (2006.01)

(56) References Cited

U.S. PATENT DOCUMENTS

| | | | | |
|---|---|---|---|---|
| 4,933,853 | A * | 6/1990 | Musil | G01S 15/88 37/382 |
| 4,943,119 | A * | 7/1990 | Zarniko | E01C 19/006 181/123 |
| 4,961,173 | A * | 10/1990 | Sehr | G01S 7/521 367/907 |
| 5,035,290 | A * | 7/1991 | Harms | E02F 3/847 172/1 |
| 5,935,183 | A * | 8/1999 | Sahm | E01C 19/006 172/4.5 |
| 5,984,420 | A * | 11/1999 | Murray | E01C 19/00 172/4.5 |
| 6,371,566 | B1 * | 4/2002 | Haehn | E01C 19/004 299/1.5 |
| 6,916,070 | B2 * | 7/2005 | Sehr | E01C 19/006 299/1.5 |
| 7,272,474 | B1 * | 9/2007 | Stentz | G01C 7/04 701/26 |
| 7,643,934 | B2 * | 1/2010 | Makela | G01C 22/00 340/903 |
| 8,274,508 | B2 * | 9/2012 | Porikli | G06K 9/00214 345/419 |
| 8,473,142 | B2 * | 6/2013 | Larsson | G09B 29/005 340/435 |
| 8,630,805 | B2 * | 1/2014 | Becker | G01S 13/867 342/179 |
| 8,794,867 | B2 | 8/2014 | Snoeck et al. | |
| 9,145,661 | B1 * | 9/2015 | Jensen | B60P 1/283 |
| 2002/0007562 | A1 | 1/2002 | Kumazawa et al. | |
| 2006/0039757 | A1 * | 2/2006 | Lemke | E01C 23/088 404/94 |
| 2007/0214687 | A1 * | 9/2007 | Woon | E02F 3/842 37/415 |
| 2009/0048782 | A1 * | 2/2009 | Chang | G06T 17/00 702/5 |
| 2009/0084173 | A1 * | 4/2009 | Gudat | B60P 1/283 73/146 |
| 2009/0202109 | A1 * | 8/2009 | Clar | G01C 15/00 382/104 |
| 2009/0311045 | A1 * | 12/2009 | Jurasz | E01C 23/088 404/75 |
| 2010/0123568 | A1 * | 5/2010 | Namuduri | B60G 17/018 340/438 |
| 2010/0174514 | A1 * | 7/2010 | Melkumyan | G06F 17/18 703/2 |
| 2010/0268355 | A1 * | 10/2010 | Chang | G01B 21/04 700/66 |
| 2011/0066313 | A1 * | 3/2011 | Larsson | G09B 29/005 701/25 |
| 2011/0130895 | A1 * | 6/2011 | Gillet | G06T 17/05 701/4 |
| 2011/0257949 | A1 * | 10/2011 | Vasudevan | G06F 17/18 703/2 |
| 2011/0274343 | A1 * | 11/2011 | Krishnaswamy | G06K 9/00201 382/154 |
| 2012/0179635 | A1 * | 7/2012 | Vasudevan | G06T 7/521 706/12 |
| 2012/0301220 | A1 * | 11/2012 | Snoeck | E01C 23/088 404/75 |
| 2013/0051913 | A1 * | 2/2013 | Eul | E01C 19/006 404/84.5 |
| 2013/0103298 | A1 * | 4/2013 | Becker | G01S 13/89 701/300 |
| 2013/0144565 | A1 * | 6/2013 | Miller | G06T 17/00 703/1 |
| 2013/0321393 | A1 * | 12/2013 | Winder | G06T 15/04 345/419 |
| 2013/0342877 | A1 * | 12/2013 | Askan | G06T 17/00 358/463 |
| 2014/0195112 | A1 * | 7/2014 | Lu | B60G 17/015 701/37 |
| 2014/0313527 | A1 * | 10/2014 | Askan | H04N 1/38 358/1.9 |
| 2014/0379254 | A1 * | 12/2014 | Miksa | G01C 21/32 701/450 |
| 2015/0109290 | A1 * | 4/2015 | Chang | G06T 17/00 345/420 |
| 2016/0187486 | A1 * | 6/2016 | Chen | G01S 17/88 702/94 |

OTHER PUBLICATIONS

Mederos, Boris et al., "Robust Smoothing of Noisy Point Clouds", published in Proc. SIAM Conference on Geometric Design and Computing (Seattle, Washington, Nov. 10-13, 2003), 2003, 13 pages, available on the Internet at: http://citeseerx.ist.psu.edu/viewdoc/summary?doi=10.1.1.139.2240.*

Schoenberg, Jonathan et al., "Distributed Terrain Estimation Using a Mixture-Model Based Algorithm", 12th International Conference on Information Fusion, Seattle, WA, USA, Jul. 6-9, 2009, pp. 960-967.*

Vasudevan, Shrihari, "Data fusion with Gaussian processes", Robotics and Autonomous Systems 60, 2012, pp. 1528-1544.*

Vasudevan, Shrihari et al., "Heteroscedastic Gaussian Processes for Data Fusion in Large Scale Terrain Modeling", 2010 IEEE International Conference on Robotics and Automation, May 3-8, 2010, Anchorage, Alaska, USA, pp. 3452-3459.*

EPO machine translation of EP 547378 (original EP document published Jun. 23, 1993).*

Gräfe, Gunnar, "Kinematic 3D laser scanning for road and railway construction surveys", 1st International Conference on Machine Control & Guidance Proceedings, MCG 2008, Jun. 24-26, 2008, ETH Zurich, Switzerland, pp. 245-254.*

Prikryl, M. et al., "Consequences of a complex using of 3D approach in the implementation of the road reconstruction—usage of TLS stop&go and usage of paving control system for milling machines", INGEO 2014—6th International Conference on Engineering Surveying, Prague, Czech Republic, Apr. 3-4, 2014, pp. 129-136.*

Williams, Keith et al., "Synthesis of transportation applications of mobile LIDAR", Remote Sensing 2013, vol. 5, Sep. 2013, pp. 4652-4692.*

* cited by examiner

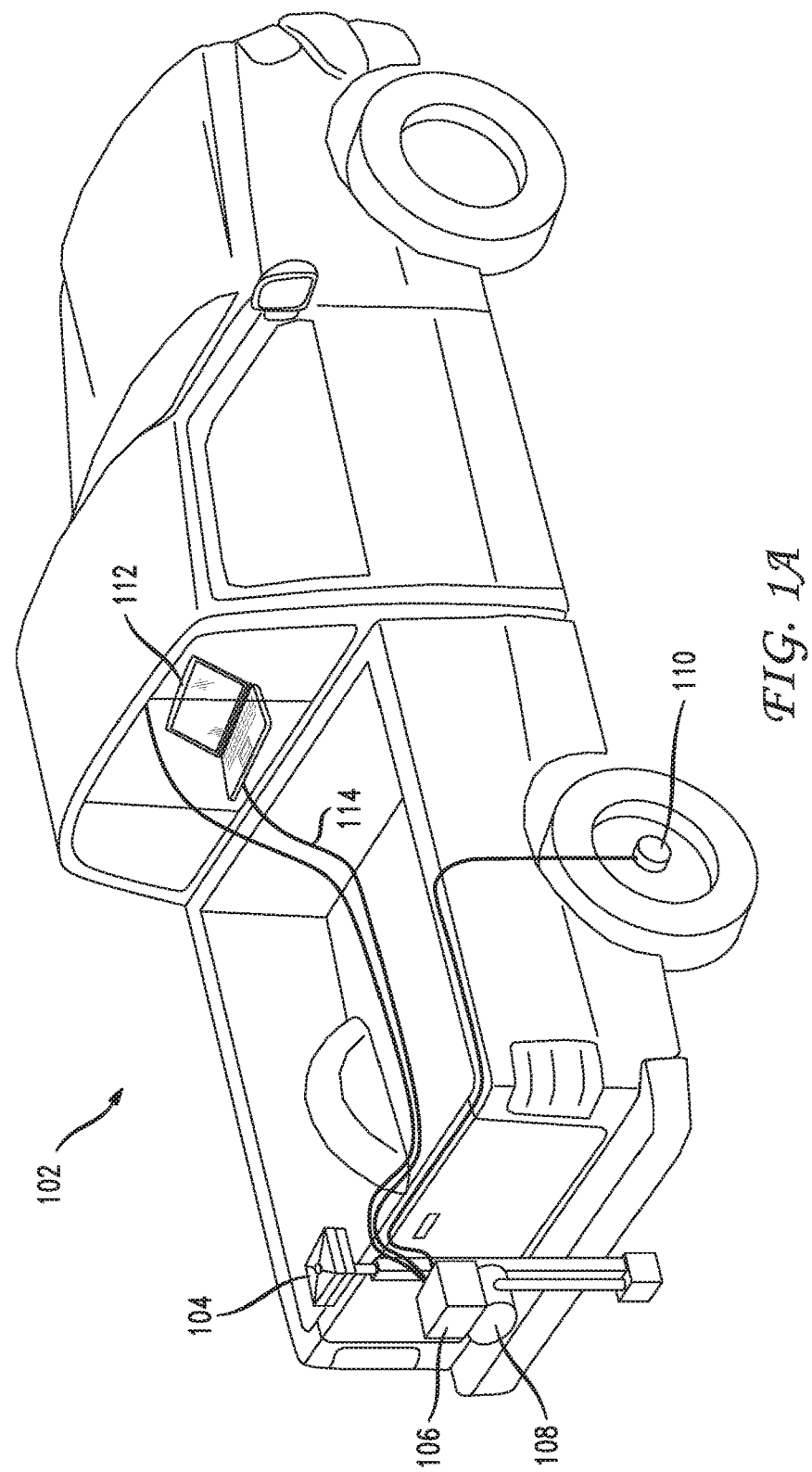

POINT CLOUD BASED SURFACE CONSTRUCTION

BACKGROUND

The present disclosure relates generally to surface construction, and more particularly to point cloud based surface construction.

Surface construction (e.g., road construction) specifications generally include a smoothness requirement. The smoothness requirement identifies a smoothness within which a surface should be constructed in order to ensure that the surface will be usable for its intended purpose. For example, a road surface must be free from dips and bumps over a certain height along a length of the surface in order to allow vehicles to travel safely over the surface at a desired speed and to produce a surface that will have a desired longevity. In addition, surface construction specifications can include information concerning how a surface must fit external references, such as curbs and gutters.

Various methods are used to construct a surface to produce a desired result (e.g., to achieve a desired smoothness). In one method various materials are used to construct a surface to prevent or minimize changes to the surface over time. Subsurface materials such as gravel or sand are typically used prior to application of a top surface. Materials used for a top surface can be asphalt, cement, macadam, etc. The materials used to construct the surface are measured to determine if the top surface of the material is smooth (i.e., free of dips and/or bumps over a certain size) within a specific range. If the surface is not smooth within the desired range, the surface must be modified. Measurement of the smoothness of a surface may occur repeatedly throughout construction of the surface. As such, different machines and different sensors may be used to measure the smoothness of the surface.

SUMMARY

In one embodiment, a method includes receiving data representing a surface from a plurality of sensors. A point cloud is generated based on the data and then filtered based on a specific sensor type to generate sensor specific data. The plurality of sensor can include, but is not limited to, a height sensor, a global navigation satellite system (GNSS) receiver, inertial measurement sensor, and a wheel sensor. The height sensor can comprises a laser based distance sensing device or a sonic based distance sensing device and the specific sensor type can be a sonic tracker of a laser scanner. In one embodiment, the filtering is based on a Gaussian filter. The sensor specific data can be transmitted to a machine for use in modifying a surface.

In one embodiment, a method comprises receiving sensor specific data at a machine having a height sensor. The sensor specific data is based on point cloud data of a surface and the point cloud data is filtered based on the characteristics of the height sensor. The surface is modified based on data from the height sensor compared to the filtered cloud data. In one embodiment, the filtered cloud data is modified to reflect a desired surface. The height sensor can be one or more of a sonic tracker, optical sensor, and/or laser scanner. In one embodiment, the point cloud data of the surface is generated based on data received from a plurality of sensors associated with a scanning machine as the scanning machine travels along the surface.

Apparatuses for implementing the above methods are also described herein.

BRIEF DESCRIPTION OF THE DRAWINGS

FIG. 1A depicts a vehicle for collecting surface data.

DETAILED DESCRIPTION

Figure 1B:
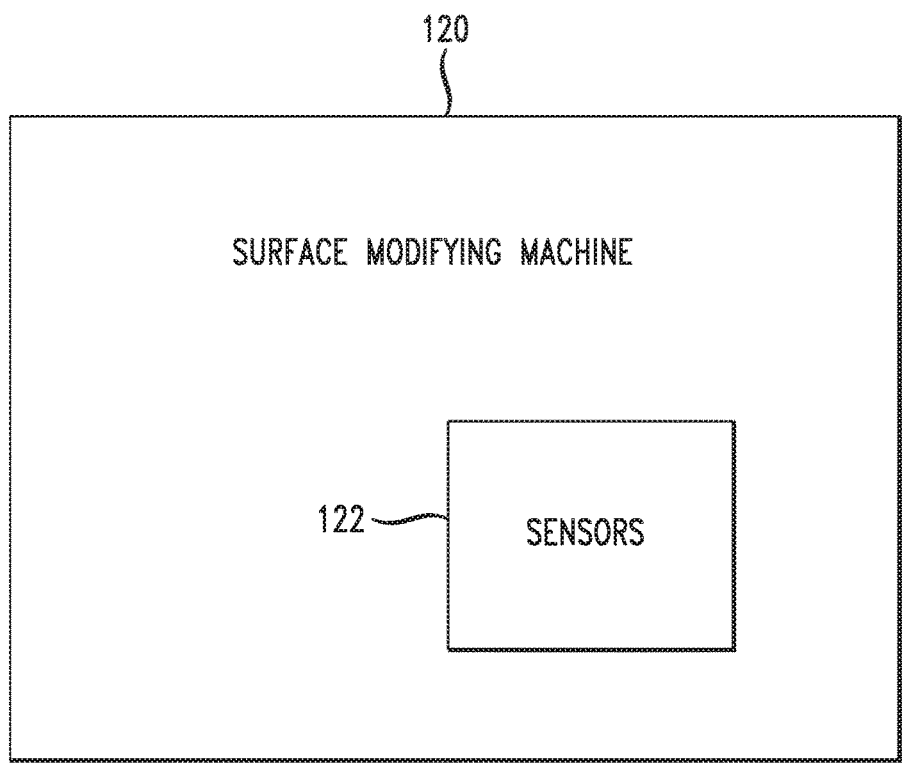
FIG. 1B depicts a schematic of a surface modifying machine.

The present disclosure describes a method and apparatus for converting data generated based on a plurality of sensors into data that can be used in conjunction with a single sensor or multiple sensors with known characteristics. Various methods of surface construction (e.g., road construction) use a machine to generate a representation of a surface. In one embodiment, this representation is called a point cloud and is generated based on data received from multiple sensors. Point cloud information can also include information concerning how a surface must fit external references, such as curbs and gutters. A machine with multiple sensors capable of sensing a surface to generate a point cloud may not be available at all times during construction of a surface. However, other machines fitted with one or two sensors may be available. Since point cloud data is a representation of a surface generated using data from multiple sensors, data from a different sensor configuration compared to point cloud data does not generally produce meaningful results. As such, point cloud data requires filtering prior to use with data from a different sensor configuration. This filtering allows certain machines and sensor types to be used to acquire point cloud data and different sensor types to be used during surface construction and modification. For example, a machine with a laser scanner, along with additional sensors, may be used during initial construction of surface information. Point cloud data obtained using the laser scanner and additional sensors must be filtered (e.g., converted) in order to be used with data from a single sensor, such as a sonic tracker. The method described herein can be utilized with various types of machine controls and surface construction methods.

Surface construction can be accomplished using two dimensional ("2D") or three dimensional ("3D") machine control systems in conjunction with various surface specifications and construction methods. The machine control systems aid in constructing a surface in accordance with a surface specification. Surface specifications can be categorized into three types: loose requirements, smoothness requirements, and strict 3D requirements.

Surface specifications with loose requirements may only specify the amount of material used. For surface specifications with loose requirements, operations may be performed with no control systems (i.e., manual control of machines such as milling machines for removing surface material and an asphalt paver for adding and shaping material). In some cases, operations for surface specifications with loose requirements use sensor technology (e.g., sonic trackers) to copy a surface and apply a fixed offset in order to cover the surface with additional material at a specific thickness.

Surface specifications with smoothness requirements typically involve operations using 2D machine control systems. A mechanical ski and/or a non-contacting averaging device using sonic tracker or laser scanner is used with the 2D machine control systems to achieve a desired smoothness. The smoothness of the surface can be determined using device, such as a profilograph, that measures unevenness of the surface.

Surface specifications with strict 3D requirements can require various sensors and devices in order to achieve elevation accuracy. To achieve strict 3D requirements, additional upgrades such as string line, total station based control, and GNSS and laser based control may be used. These upgrades are described in more detail below.

As previously stated, surfaces can be constructed according to surface specifications using 2D machine control. 2D machine control is often used in surface construction and can consist of a machine moving along a surface (e.g., the first dimension) where vertical adjustments (e.g., second dimension) are automated.

It should be noted that vertical adjustments can be manually controlled. When vertical adjustments are manually controlled, the vertical distance (e.g., offset) is monitored by the operator visually or can be monitored using a sensor output (e.g., a sonic tracker).

In operations where a surface specification is used to indicate a number of vertical distances along a surface, 2D machine control can be used. The 2D machine control tracks the surface and controls the vertical aspect of the machine to match the shape of the surface with a certain offset. The operator adjusts the offset according to numbers provided based on the surface specification. These numbers can be written on the surface before modification of the surface has started. The numbers can then be seen by a user operating a machine as the machine travels along the surface.

A 2D machine control can be used with an averaging system. The averaging system can be a mechanical type system, sonic based distance sensing system, and/or a laser based distance sensing system. It should be noted that, regardless of the type of averaging system used, the 2D machine control with an averaging system does not track the actual surface, but a representation of an average of the surface.

3D machine control can be used if a surface has been surveyed at a sufficient interval (in a longitudinal direction) and if all break lines in cross direction are captured as well. When using 3D machine control, the position of the finishing part of the machine (i.e., the part of the machine that will modify or create the top of the surface such as a screed, drum, or blade) must be known in three dimensions such as X, Y, and Z; or latitude, longitude, and elevation; station, offset, and elevation; etc. This position can be relative to a known local point or calculated using a projection system (e.g., a 3D coordinate system). When the machine is moving, the location of the finishing part of the machine is continuously calculated and compared to surface design information. The machine control system continuously adjusts to try and match the position of the finishing part to the surface specification (e.g., surface design) at each location along the surface.

Multiple global navigation satellite system ("GNSS") receivers can be used in conjunction with 3D machine control. However, GNSS has a limited accuracy especially with respect to elevation. This limited accuracy may not be adequate to achieve the desired result for surface construction.

The elevation inaccuracy of GNSS receivers can be overcome using external reference equipment. A total station can track a prism that is mounted to a finishing part of the machine. The position information determined using the prism is transmitted to a control system on the machine where it controls the elevation of the finishing part of the machine to match the elevation that is continuously extracted from design data for the surface at the location of the machine. Another method of using an external reference is to transmit a laser beam from a known point that is tracked on the machine near GNSS antennas. The horizontal position information with accurate elevation data from the laser transmitter can be combined by a system that controls the finishing part of the machine.

The methods above may not be conducive to surface construction when the smoothness of the surface is a high priority. Although 3D machine solutions can be used to construct a surface within a surface specification, the smoothness of the finished surface may not be sufficient. This can be due to the difficulty in working with external elevation references.

Data collection of data points to generate a representation of a surface can be accomplished using a vehicle equipped with multiple sensors. This typically requires a sensing device (such as a sonic based distance sensing device) to be placed above points of the surface to be tracked. Alternatively, a laser based distance sensing system can be used. A laser tracker based distance sensing system typically detects 2-3 points of a surface per data collection run in a transverse direction. Independent collection runs can be 'stitched' together accurately if sufficient additional data is available. The sensing device (e.g., laser tracker) is typically placed directly above the tracked points. Point cloud based solutions using multiple sensors to detect the contour of a surface can be used to generate a representation of a surface. Point cloud based solutions, without data modification, typically have excessive noise data. Point cloud solutions also produce a lot of data and the files containing this data are not processed easily for design purposes. Finally, post processing of data with point cloud solutions can be time consuming.

Machine control using the surface as a reference can be performed but certain issues can affect the accuracy of the finished surface. Machine control using the surface as a reference requires the sensing device (either mechanical or sonic) to be on top of the location where the data was collected. Positioning is typically based on a wheel sensor that can stick or slip. Finally, machine control using the surface as a reference requires a highly skilled operator.

In one embodiment, a method for use with a paving and/or milling process uses a point cloud data set that is modified so that it can be used for machine control using a single control sensing component (e.g., a sonic tracker). Surface data is collected using a combination of sensors. The data is processed to create a point cloud and the point cloud data is then filtered to generate data that simulates the way a specific sensor would sense the surface.

FIG. 1A depicts a vehicle 102 equipped with multiple devices and sensors that can be used to provide measurements of a surface. Vehicle 102, in this example, a pickup truck, is shown having a global navigation satellite system (GNSS) receiver 104 which can be used to determine a location of vehicle 102. Container 106, in this example, holds a processing unit which is used, in one embodiment, to provide time stamps for data from various sensors and devices. Container 106 also holds an inertial measurement unit (IMU) that can be used to detect movement of vehicle 102. Housing 108 contains a laser based distance sensing device for determining a distance from the sensing device to a surface on which vehicle 102 is moving over. Vehicle 102 is shown having a wheel sensor 110 that can be used to determine movement of vehicle 102. Wheel sensor 110, in one embodiment, is an encoder but can be any type of sensor for detecting rotation.

Data from GNSS receiver 104, IMU, and laser based distance sensing device, in one embodiment, are transmitted to the processing unit in container 106 to be time stamped. The time stamped data is then transmitted to data storage device 112 via cable 114. It should be noted that data can be transmitted from various sensors and devices to the processing unit and/or data storage device 112 wirelessly.

As vehicle 102 travels over a surface, the various sensors and devices collect data pertaining to the surface. For example, GNSS receiver 104 can be used to determine the location of vehicle 102. The IMU can also be used to detect movement of vehicle 102 and determine the location of vehicle 102. Various types of distance sensors can be used to determine the contour of the surface by measuring a distance from a point or area of the surface below the height sensor to the height sensor. In one embodiment, housing 108 also contains an optical based distance sensing device that is used to determine a distance from the optical distance sensing device to a surface over which vehicle 102 is moving. The optical based distance sensing device, in one embodiment, comprises one more cameras. The one or more cameras collect other details of the surface that other sensors cannot sense. In addition, a pair of cameras can be used to determine distance from the cameras to the surface over which vehicle 102 is travelling using methods such as triangulation. In other embodiments, optical based distance sensing device can be other types of optical devices and/or sensors.

Laser based distance sensing devices and optical based distance sensing devices can be used together. For example, as shown in FIG. 1A, the laser based distance sensing device and/or optical based distance sensing device in housing 108 can be used to measure distance. The distance sensor can be any type of sensor for measuring a distance such as a sonic tracker or a laser scanner, or a combination of sensors. In one embodiment, variations of a surface are detected optically using one or more optical distance sensors. In one embodiment, a pair of optical sensors is used for stereo imaging of the surface. Data from an optical based distance sensing device located in housing 108 can be transmitted to the processing unit in container 106.

In one embodiment, wheel sensor 110 can include a rotation sensor to sense movement of vehicle 102. Data from one or more sensors or devices mounted to vehicle 102 can be transmitted to data storage device 112 which can store and analyze the data. Data from data storage device 112 may also be transmitted to a remote location via as a communication antenna.

It should be noted that sensors for detecting the contour of a surface can be mounted to machines or devices other than vehicle 102. For instance, various sensors for detecting the contour of a surface may be mounted to a construction machine, such as a road roller. Any type of machine that can move or be moved over a surface and can be equipped with one or more sensors can be used to detect the contour of the surface.

In one embodiment, the sensors and devices mounted to vehicle 102 are used to generate point cloud data. The point cloud data forms a representation of a surface. Point cloud data can then be used to determine modifications that may be required in order to satisfy a smoothness requirement of the surface or other requirement. In one embodiment, data is collected to focus on capturing details of a surface near vehicle 102 that the sensors are attached to. In one embodiment, multiple sensors on multiple machines can be combined to generate point cloud data.

In one embodiment, one or more mechanical based distance sensors are used to measure the contour of a surface. Mechanical based distance sensors can be used alone or in conjunction with other types of sensors. In one embodiment, a mechanical based distance sensor comprises a string potentiometer configured to sense a position of an end gate of a construction machine. As the end gate is moved vertically by the contour of the surface over which the end gate is moving, the string potentiometer outputs data related to the vertical position and the end gate. This data can be interpreted to determine the contour of the surface over which the end gate is moving. In one embodiment a side blade is used in conjunction with a string potentiometer to sense the contour of a surface.

After the data from the sensors has been acquired, the data is used to generate a point cloud representing the surface. The point cloud can be generated by data storage device 112 or by a device (e.g., a computer) located remote from vehicle 102, or a combination of both. In embodiments where the point cloud is generated at least in part by a remote computer, data from the sensors can be transmitted to the remote computer via a communication antenna or other means.

Point cloud data provides a specific representation of a surface based on a combination of data from one or more sensors. It should be noted that point cloud data may be compared to other point cloud data. However, point cloud data cannot typically be easily compared to data from a single sensor, such as a sonic distance sensing device or a laser distance sensing device or any other sensor system using different types of sensors or configurations. As such, in order to utilize point cloud data directly in constructing and/or modifying a surface, a reference point cloud representing a desired shape of a surface should be compared to a point cloud generated based the current condition of the surface. Since point cloud generation can require significant processing, it is often performed remote from the construction machine used to acquire the sensor data representing the surface. As such, point cloud generation is generally not performed by a component of a construction machine or vehicle sensing a current condition of a surface.

Although construction machines are typically not configured to generate point cloud data, control units of construction machines can compare sensor data to reference data in order to generate information for display to an operator. For example, reference data based on a sonic tracker can be compared to data from another sonic tracker. Similarly, reference data based on a laser scanner can be compared to data from another laser scanner. However, point cloud data, without modification, cannot be compared to either sonic based sensor data or laser based sensor data.

In one embodiment, point cloud data is filtered to generate data that may be used as reference data for surface construction. Specifically, the point cloud data is filtered (also referred to as modified) to generate data that can be compared to data from a specific type of sensor. For example, point cloud data of a surface can be filtered to generate reference data for comparison with data from a sonic tracker. In one embodiment, the reference data may be modified to reflect a desired surface. Filtering of point cloud data can be performed on a control unit of a machine that was used to acquire the point could data. In one embodiment, filtering is performed remotely and filtered data is transmitted to a machine for use. In one embodiment, filtering is performed remotely and data generated based on the filtering is transmitted to a machine for modifying a surface as the machine is modifying the surface. Modification of reference data to reflect a desired surface can be performed by a machine modifying a surface or remotely by a separate device and transmitted to a machine for use in modifying a surface. In one embodiment modification of reference data to reflect a desired surface is performed remotely and transmitted to a machine for modifying a surface as the machine modifies the surface.

FIG. 1B depicts a schematic of a surface modifying machine 120 having a plurality sensors 122 for sensing a surface over which surface modifying machine 120 moves.

Figure 2:
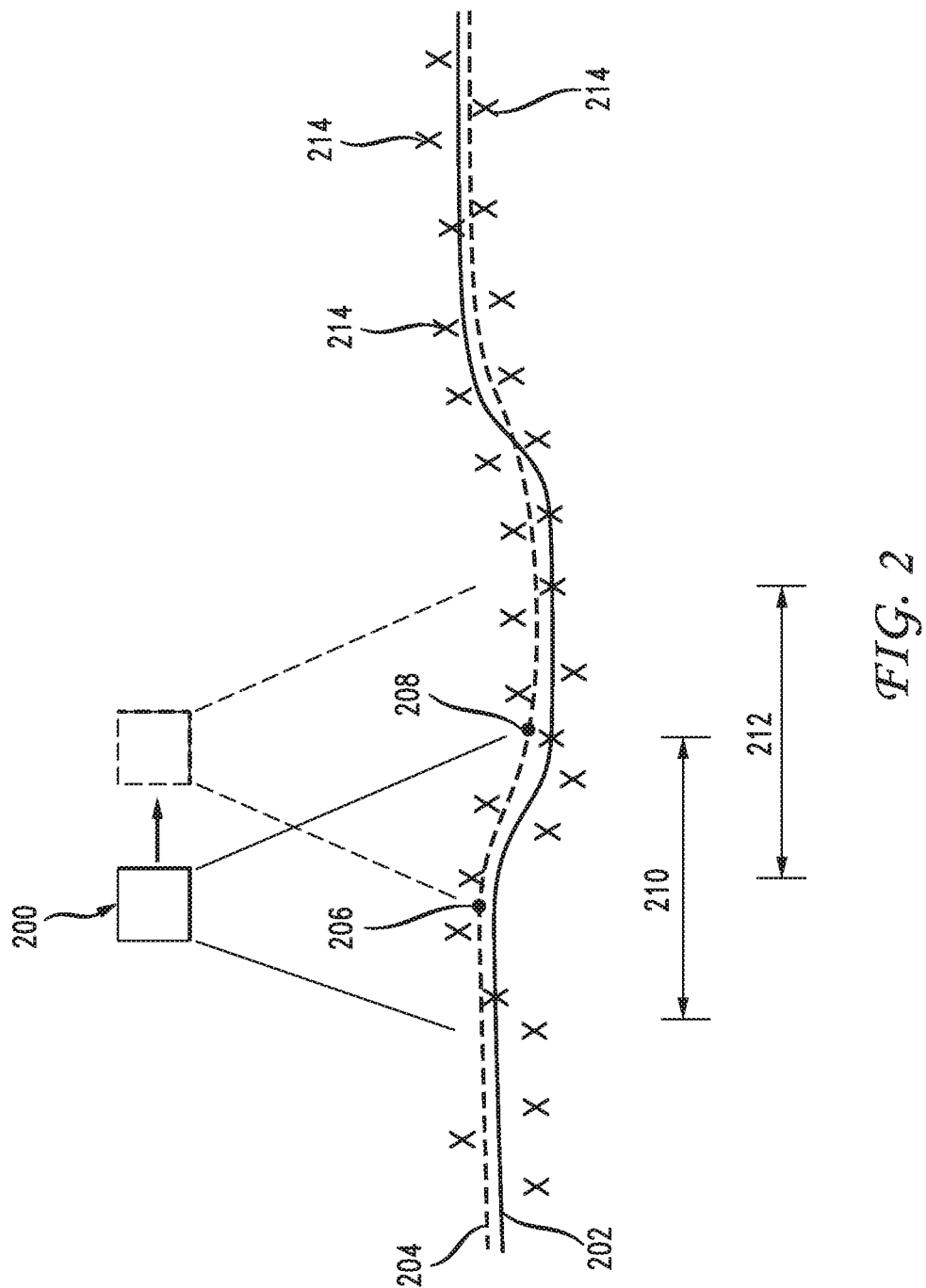
FIG. 2 depicts a sensor and acquired sensor data.

FIG. 2 depicts a sensor and acquired sensor data. FIG. 2 shows sensor 200 moving from a first position to a second position (shown in phantom). Sensor 200, shown in FIG. 2, is a sonic tracker but can be other types of sensors, such as a laser scanner. Sensor 200 outputs data as it moves from the first position to the second position. The data sensor 200 outputs a representation of surface 202 and is depicted as dashed line 204. As shown in FIG. 2, data from sensor 200 represents an average of surface 202 over a length of the surface sensor 200 is currently located. For example, sensor 200 is shown in the first position outputs data point 206 representing an average of surface 202 over distance 210 which is shown as data point 206 in FIG. 2. Distance 210 is the length of surface 202 which is sensed by sensor 200 in the first position. Similarly, data point 208 represents an average of surface 202 over distance 212.

Crosses 214 shown in FIG. 2 represent points of a point cloud which represents surface 202. As shown in FIG. 2, the numerous crosses 214 do not provide a set of data points similar to the surface representation generated by sensor 200 shown in FIG. 2 as dashed line 204.

In one embodiment, point cloud data for a surface is filtered in order to produce a surface representation similar to a representation produced by a specific sensor (e.g., sonic tracker 200 of FIG. 2). Filtering of point cloud data, in one embodiment, is performed by modifying point cloud data using an algorithm.

Various filtration methods can be used for converting point cloud data to data representing a surface as sensed by a particular sensor. In one embodiment, a filtration method for converting point cloud data to data representing a surface as sensed by a particular sensor is based on a Gaussian filter. In one embodiment, the filter is applied to only points of the point cloud that represent a height coordinate and a smoothing effect depends on filter sigma (shown in the equation below as σ). For every point $P_i$ in the point cloud, all points $P_j$ that are located in a specific area A about point $P_i$ are determined. The filtered height $h'_i$ for point $P_i$ is calculated as a weighted average of heights $h_j$ for all points $P_j$ that belong to A as follows:

$$h'_i = \sum_{P_j \in A} W_{ij} * h_j \bigg/ \sum_{P_j \in A} W_{ij}, \; w_{iji} = \exp(-|P_i - P_j|^2/2/\sigma^2)$$

In one embodiment, area A is defined as a 4σ*4σ*4σ cube in Earth Centered, Earth Fixed ("ECEF") coordinates. It should be noted that in one embodiment, A is defined as a cube, and not a sphere, in order to decrease calculation time.

In one embodiment, a caching scheme to improve performance (e.g., decrease computation time). The caching scheme, in one embodiment, comprises loading a 16σ*16σ*16σ cube in ECEF coordinates from a database and using the cube for several points that fit within the cache.

Sigma can be a range of values. In one embodiment, sigma is set to 20 centimeters. It should be noted that even though the actual area used for averaging is 4σ*4σ*4σ cube, the effective area is a sphere with a radius of 2σ. This occurs because Gaussian weights used for averaging decline very quickly when a distance between two points is bigger than sigma.

In one embodiment, the Gaussian filter described herein is used for converting point cloud data to data for use with a sonic tracker. The Gaussian filter described herein can be modified for use with other types of sensors. In one embodiment, other types of filters are used to produce data for use with a specific sensor.

Figure 3:
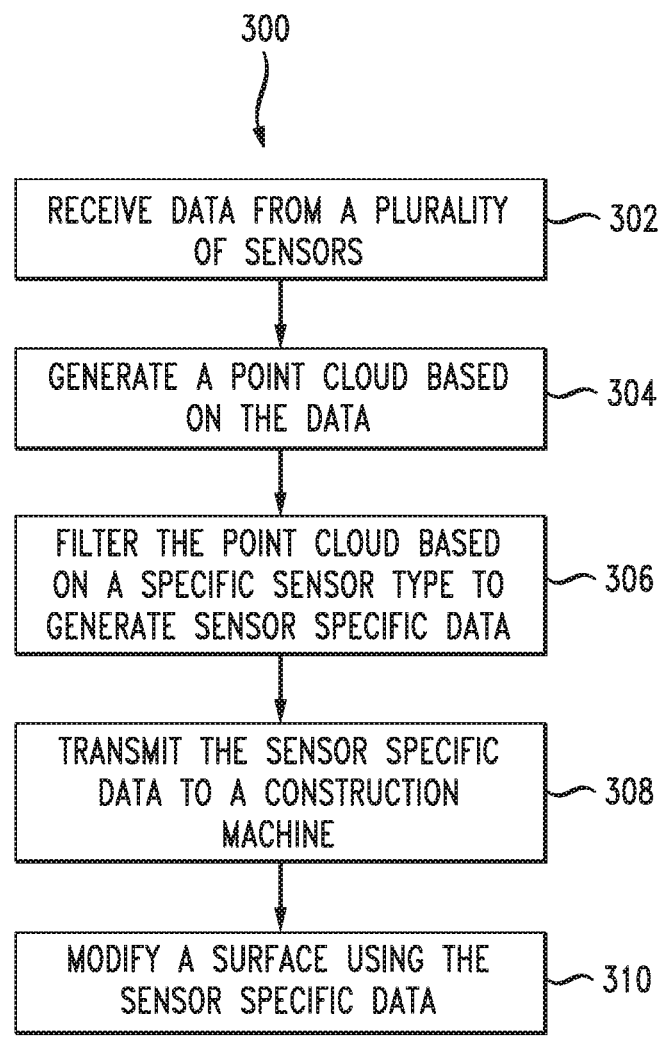
FIG. 3 depicts a flow chart of a method according to an embodiment.

FIG. 3 depicts a flow chart of method 300 for filtering point cloud data. At step 302, data is received from a plurality of sensors. In one embodiment, the sensors are attached to a scanning machine, such as a construction machine, that is moving along a surface. In another embodiment, the scanning machine is a vehicle such as a pickup truck. The data represents the surface as sensed by the plurality of sensors. The data, in one embodiment, is transmitted from the scanning machine to a remote location for analysis and/or modification (e.g., filtering).

At step 304, a point cloud is generated based on the data received from the plurality of sensors. It should be noted that the point cloud can be generated using data from all of the sensors on the scanning machine or a subset of the sensors located on the scanning machine.

At step 306, the point cloud is filtered based on a specific sensor type to generate sensor specific data. For example, the point cloud can be filtered to generate sonic based sensor type data, laser sensor type data, and/or mechanical based distance sensing device data.

At step 308, the sensor specific data is transmitted to a construction machine for use in modifying the surface. For example, point cloud data can be generated based on a scanning machine using a plurality of sensors. The point cloud data can be filtered to generate sensor specific data for use with a construction machine having the specific sensor. As such, point cloud data can be converted into data that can be used with a sensor that is located on a particular construction machine.

At step 310, a surface is modified by a construction machine using the sensor specific data.

Method 300 can be used, for example, when a machine with only a single sensor, such as a sonic tracker, is available for surface construction. A point cloud previously generated for a particular surface was based on data from multiple sensors. As such, the point cloud data compared to data from a sonic tracker of the surface would not produce meaningful information. The point cloud data is filtered to produce a representation of the surface that is an approximation of what a surface representation captured using a sonic tracker would produce. This filtered data can then be compared to data from a sonic tracker in order to determine differences between the height of the surface and a desired height of the surface. Similarly, when a machine with only a laser scanner, or other type of height sensor, is available for surface construction, point cloud data of the surface can be filtered to produce data that is an approximation of what a surface representation captured using the laser scanner, or other height sensor, would produce.

It should be noted that filtered data can be further modified to produce additional data. For example, filtered data can be further modified to generate a representation of modifications required to a surface in order to change a surface from its current smoothness to a desired smoothness.

In one embodiment, filtering can be performed in real time either on the construction machine or remotely and transmitted to the construction machine. For example, point cloud data can be filtered at a remote location and transmitted to a construction machine as needed based on data from the construction machine indicating its location with respect to the surface. As such, data pertaining to a particular portion of the surface that the construction machine is currently, or will soon be modifying (e.g., 2-3 feet in front of the construction machine's surface modification implement or device), can be transmitted to the construction machine as needed based on the location and movement of the construction machine. This can reduce the amount of memory required by various controls and devices of the construction machine. In one embodiment, point cloud data converted into date for use with a specific sensor the construction machine is equipped with is transmitted to the construction machine and the construction machine modifies the received data based on a desired surface. In one embodiment, the data transmitted to the construction machine is modified to take into account the desired surface.

It should be noted that although various sensors and devices are shown mounted to rear of vehicle 102 in FIG. 1A, the sensors and devices can be located on the front or sides or vehicle 102 as well. In one embodiment, the sensors and devices shown mounted to the rear of vehicle 102 in FIG. 1A may be mounted separately in various locations on vehicle 102. Vehicle 102 is shown as a pickup truck but can be any type of vehicle or machine capable of moving, or being moved, over a surface.

Figure 4:
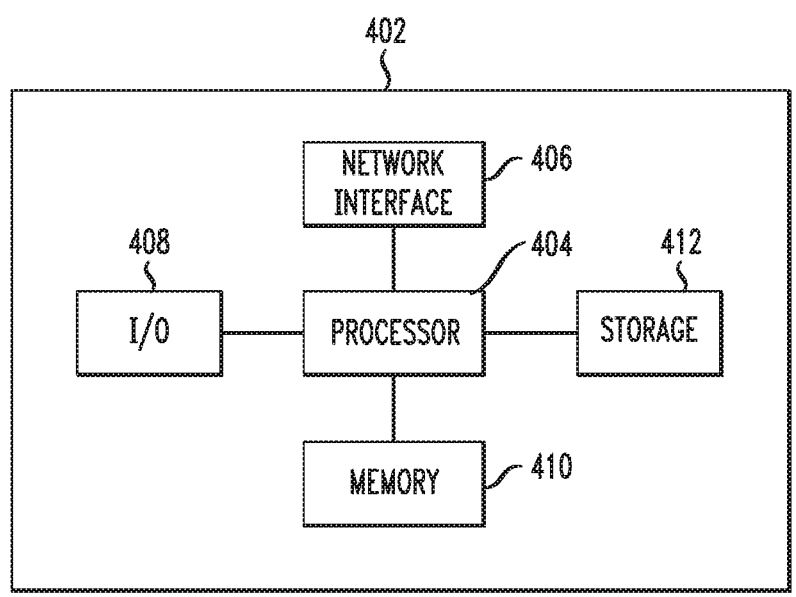
FIG. 4 depicts a high-level block diagram of a computer.

Processing unit, IMU, GNSS receiver 104, optical based distance sensing device, laser based distance sensing device, and data storage device 112 of FIG. 1A as well as a remote device for generating and filtering point cloud data can be implemented using a computer. A high-level block diagram of such a computer is illustrated in FIG. 4. Computer 402 contains a processor 404 which controls the overall operation of the computer 402 by executing computer program instructions which define such operation. The computer program instructions may be stored in a storage device 412, or other computer readable medium (e.g., magnetic disk, CD ROM, etc.), and loaded into memory 410 when execution of the computer program instructions is desired. Thus, the method steps of FIG. 3 can be defined by the computer program instructions stored in the memory 410 and/or storage 412 and controlled by the processor 404 executing the computer program instructions. For example, the computer program instructions can be implemented as computer executable code programmed by one skilled in the art to perform an algorithm defined by the method steps of FIG. 3. Accordingly, by executing the computer program instructions, the processor 404 executes an algorithm defined by the method steps of FIG. 3. The computer 402 also includes one or more network interfaces 406 for communicating with other devices via a network. The computer 402 also includes input/output devices 408 that enable user interaction with the computer 402 (e.g., display, keyboard, mouse, speakers, buttons, etc.). One skilled in the art will recognize that an implementation of an actual computer could contain other components as well, and that FIG. 4 is a high level representation of some of the components of such a computer for illustrative purposes.

The foregoing Detailed Description is to be understood as being in every respect illustrative and exemplary, but not restrictive, and the scope of the inventive concept disclosed herein is not to be determined from the Detailed Description, but rather from the claims as interpreted according to the full breadth permitted by the patent laws. It is to be understood that the embodiments shown and described herein are only illustrative of the principles of the inventive concept and that various modifications may be implemented by those skilled in the art without departing from the scope and spirit of the inventive concept. Those skilled in the art could implement various other feature combinations without departing from the scope and spirit of the inventive concept.

The invention claimed is:

1. A method for modifying a surface, the method comprising:
   generating surface data at a first time by moving a first plurality of sensors over the surface, the first plurality of sensors comprising a first type of height sensor;
   generating a point cloud comprising height data based on the surface data generated at the first time;
   generating a sensor specific surface representation by modifying the height data of the point cloud using a Gaussian filter based on characteristics of a sonic tracker;
   generating surface data at a second time by moving the sonic tracker over the surface;
   comparing the surface data generated at the second time to the sensor specific surface representation; and
   modifying the surface based on the comparing.

2. The method of claim 1, wherein the first plurality of sensors further comprises a GNSS receiver, an inertial measurement sensor, or a wheel sensor.

3. The method of claim 1, wherein the first type of height sensor comprises a laser based distance sensing device.

4. The method of claim 1, wherein the first type of height sensor comprises a sonic based distance sensing device.

5. The method of claim 1, wherein the first type of height sensor comprises a mechanical based distance sensing device.

6. The method of claim 1, wherein the first type of height sensor comprises a camera.

7. A method for modifying a surface, the method comprising:
   generating surface data at a first time by moving a surface scanning machine over the surface, the surface scanning machine comprising a first plurality of sensors, the first plurality of sensors comprising a first type of height sensor;
   generating a point cloud comprising height data based on the surface data generated at the first time;
   generating a sensor specific surface representation by modifying the height data of the point cloud using a Gaussian filter based on characteristics of a sonic tracker;
   generating surface data at a second time by moving a surface modifying machine over the surface, the surface modifying machine comprising the sonic tracker;
   comparing the surface data generated at the second time to the sensor specific surface representation; and
   modifying the surface based on the comparing.

8. The method of claim 7, wherein the first type of height sensor is a sonic based distance sensing device.

9. The method of claim 7, wherein the first type of height sensor is a laser based distance sensing device.

10. The method of claim 7, wherein the first type of height sensor is a mechanical based distance sensing device.

11. The method of claim 7, wherein the first type of height sensor is a camera.

12. An apparatus comprising:
   a processor; and a memory to store computer program instructions, the computer program instructions when executed on the processor cause the processor to perform operations comprising:

receiving surface data generated at a first time from a surface scanning machine, the surface data generated at the first time generated based on movement of the surface scanning machine over a surface, the surface scanning machine comprising a first plurality of sensors, the first plurality of sensors comprising a first type of height sensor;

generating a point cloud comprising height data based on the surface data generated at the first time;

generating a sensor specific surface representation by modifying the height data of the point cloud using a Gaussian filter based on characteristics of a sonic tracker;

receiving surface data at a second time, the surface data at the second time generated based on movement of a surface modifying machine over the surface, the surface modifying machine comprising the sonic tracker;

comparing the surface data generated at the second time to the sensor specific surface representation; and generating data for use in modifying the surface, by the surface modifying machine, based on the comparing.

13. The apparatus of claim 12, wherein the first plurality of sensors further comprises a GNSS receiver, an inertial measurement sensor, or a wheel sensor.

14. The apparatus of claim 12, wherein the first type of height sensor comprises a laser based distance sensing device.

15. The apparatus of claim 12, wherein the first type of height sensor comprises a sonic based distance sensing device.

16. The apparatus of claim 12, wherein the first type of height sensor comprises a mechanical based distance sensing device.

17. The apparatus of claim 12, wherein the first type of height sensor comprises a camera.

18. An apparatus comprising:
a processor; and
a memory to store computer program instructions, the computer program instructions when executed on the processor cause the processor to perform operations comprising:

receiving a sensor specific surface representation generated by modifying height data of a point cloud using a Gaussian filter based on characteristics of a sonic tracker, the point cloud based on surface data generated at a first time based on movement of a first plurality of sensors over a surface, the first plurality of sensors comprising a first type of height sensor;

generating surface data at a second time, the surface data at the second time based on movement of a surface modifying machine over the surface, the surface modifying machine comprising the sonic tracker;

comparing the surface data generated at the second time to the sensor specific surface representation; and generating data for use in modifying the surface, by the surface modifying machine, based on the comparing.

19. The apparatus of claim 18, wherein the first type of height sensor is a sonic based sensing device.

20. The apparatus of claim 18, wherein the first type of height sensor is a laser based sensing device.

21. The apparatus of claim 18, wherein the first type of height sensor is a mechanical based sensing device.

22. The apparatus of claim 18, wherein the first type of height sensor is a camera.

* * * * *

UNITED STATES PATENT AND TRADEMARK OFFICE
CERTIFICATE OF CORRECTION

PATENT NO. : 10,066,346 B2
APPLICATION NO. : 14/825125
DATED : September 4, 2018
INVENTOR(S) : Jan Mennink et al.

Page 1 of 1

It is certified that error appears in the above-identified patent and that said Letters Patent is hereby corrected as shown below:

In the Specification

Column 7, Line 55, " $h'_i = \sum_{P_j \in A} w_{ij} * h_j \Big/ \sum_{P_j \in A} w_{ij}, w_{ij_i} = \exp(-|P_i - P_j|^2 / 2 / \sigma^2)$ " should read -- " $h'_i = \sum_{P_j \in A} w_{ij} * h_j \Big/ \sum_{P_j \in A} w_{ij}, w_{ij} = \exp(-|P_i - P_j|^2 / 2 / \sigma^2)$ " --.

Signed and Sealed this
Nineteenth Day of February, 2019

Andrei Iancu
*Director of the United States Patent and Trademark Office*